April 21, 1936.  A. G. FELDMAN  2,038,169
BABY CARRIAGE
Filed April 11, 1935  2 Sheets-Sheet 2
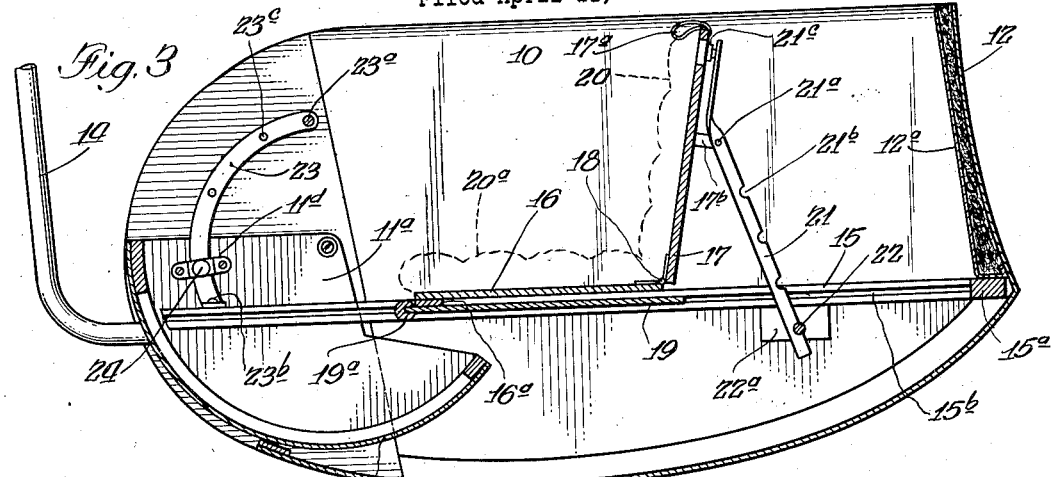
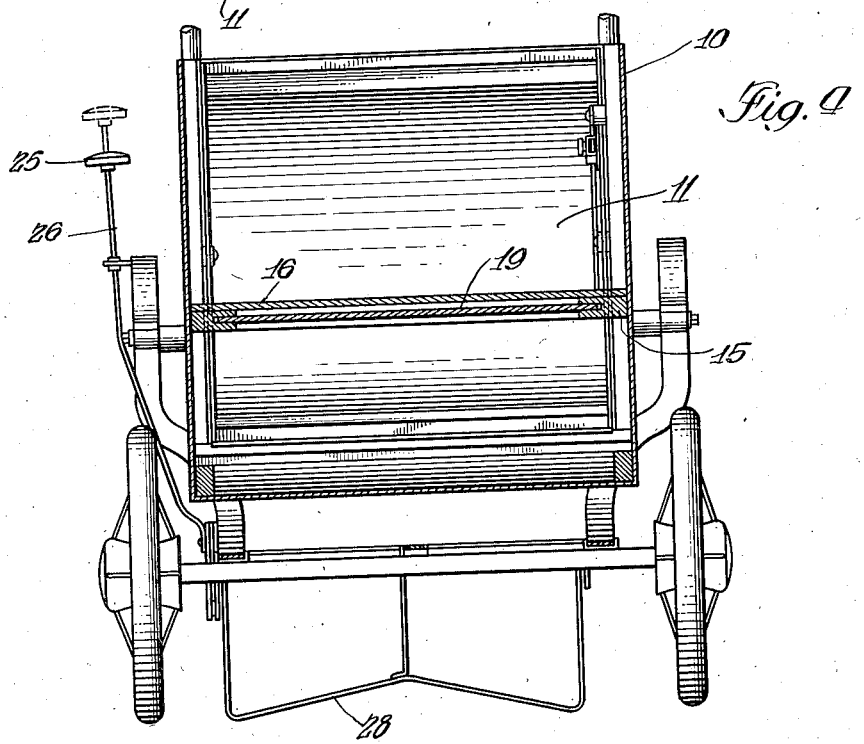
Inventor:
A. G. Feldman.
By: Stevens & Batchelor
Atty's.

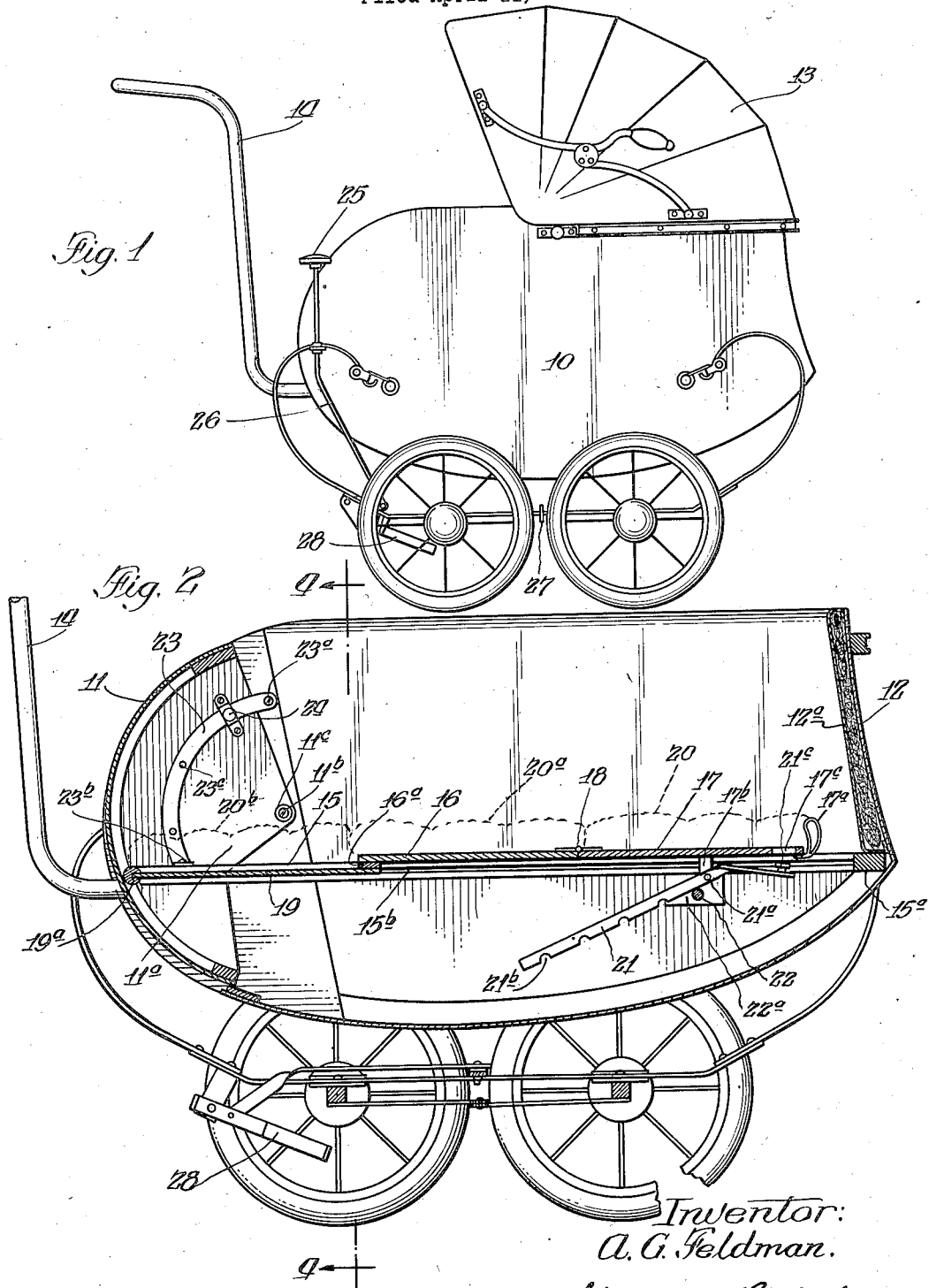

Patented Apr. 21, 1936

2,038,169

UNITED STATES PATENT OFFICE 2,038,169

BABY CARRIAGE

Abraham G. Feldman, Chicago, Ill.

Application April 11, 1935, Serial No. 15,893

7 Claims. (Cl. 280—47)

My invention relates to baby carriages, and more particularly to those of the coach type, and my main object is to provide a coach which is readily convertible into a stroller or go-cart.

A further object of the invention is to so design the novel coach so that both the converting and restoring functions are simple and quickly performed.

A still further object of the invention is to build the coach with a frame which has a section convertible from a horizontal position to a number of upright positions to form a back rest when the vehicle is used as a stroller, simple means being included for the locking and manipulation of the said back rest.

Another object of the invention is to form the coach with a frame which permits the withdrawal of a section thereof to provide room in the forward portion of the coach for the feet of the occupant when the vehicle is used as a stroller.

An additional object of the invention is to include in the coach a front wall which is movable by a novel mechanism to afford clearance when the vehicle is used as a stroller.

An important object of the invention is to construct the improved portion of the vehicle with the fewest number of parts consistent with its functions, whereby to render the improvement economical to manufacture.

With the above objects in view, and any other objects that may suggest themselves from the description to follow, a better understanding of the invention may be had by reference to the accompanying drawings, in which—

Fig. 1 is an elevation of the improved coach;

Fig. 2 is a longitudinal and enlarged vertical section of the body portion thereof in the form of a baby carriage;

Fig. 3 is a view similar to Fig. 2, showing the body portion converted for use as a stroller; and Fig. 4 is a vertical section on the line 4—4 of Fig. 2, and illustrating a change of position in a prop device used in connection with the vehicle.

When an infant is old enough to sit up, it is customary to change his mode of travel from a baby carriage to a stroller, since the latter form of vehicle lends more comfort to the occupant in a sitting position and affords more interest during travel. However, in late years baby carriages have been developed considerably for comfort, durability and safety from the elements, culminating in the popular coach style. As this type of carriage is more or less expensive, people with limited means hesitate to cast it aside and go to a further expense to purchase the stroller type when the proper time comes. Therefore, the child is denied the diversion and recreation afforded by the latter type of vehicle. I have for this reason devised certain improvements applicable to the coach type of carriage, by means of which the same is easily convertible to serve as a stroller and as easily restored to original form, the vehicle being as comfortable in either form and occasioning no radical increase in cost on account of its improvements.

In carrying out the invention, it is seen that the conventional coach design is employed, 10 representing the body sides, 11 the front wall, 12 the back, 13 the folding top, and 14 the push handle.

While the conventional coach has a flat bottom on the inside to serve as a base or support for the occupant, I have altered the frame of the base to suit the improved construction. Thus, the base is composed of side rails 15 and a back rail 15a, the side rails being grooved as indicated at 15b along their inner edges. Over the middle portion of the side rails is rigidly secured a base board 16, this board being supplemented in a rearward direction by a similar board 17 connected to the base board by hinges 18. The base board is also supplemented in a forward direction by a third board 19 which is mounted with its sides in the frame grooves 15b to be slidable from the position shown in Fig. 2 in a rearward direction to that indicated in Fig. 3. The base board 16 has a frontal cross strip 16a secured underneath and adapted to form an abutment for a bead enlargement 19a forming the forward end of the board 19, the strip 16a serving as a stop to prevent further recession of the board 19 from the position indicated in Fig. 3. It is seen in Fig. 2 that the set of boards 16, 17 and 19 form a bed or support for the set of three cushions 20, 20a and 20b usually considered as completing the bed portion of the vehicle. The back 12 is also formed with a permanent cushion 12a on the forward side, and the vehicle as indicated in Fig. 2 serves as a conventional baby carriage.

For the conversion of the carriage to a stroller, a strap handle 17a secured to the rear end of the board 17 may be employed to raise such board to an upright position, whereby to serve as a back rest. In order that the back rest may be adjustable to positions of more or less incline as may be found most comfortable, I have attached a simple mechanism to the board 17 to serve the purpose, this mechanism featuring principally an arm 21. This arm, as indicated in Fig. 2, is positioned longitudinally of the carriage, being pivoted at 21a near its rear end to a hanger 17b depending from the board 17. The fore part of the arm 21 has a longitudinally spaced series of notches 21b in its lower edge, while the rear part of the arm is twisted to appear flat from above and somewhat deflected. Near its extremity this portion carries a finger button 21c on its upper side, such button being visible and accessible through an opening 17c made in the board 17.

Ordinarily, the fore part of the arm 21 rests upon a cross rod 22 rigidly secured in side plates 22a carried by the side walls 10 of the carriage body. However, when the board 17 is raised, the weight of the said arm fore part causes it to ride upon the rod 22 and stop when the first notch 21b seats the rod. The board 17 now rests at a low incline, but it may be released for a rising movement by applying the finger to the button 21c with a pressure sufficient to dislodge the arm from the rod. Thus, it is apparent that the board may be locked in any one of several progressively inclined positions, the final one of these being almost vertical, as indicated in Fig. 3. It follows that the button 21c may again be pressed to release the arm 21 when it is desired to lower the back rest to any of the previous positions.

It is seen that the front wall 11 of the carriage body is of the enclosed type, in order to afford sufficient end protection when the vehicle is used as a baby carriage. However, when the vehicle is to be converted to a stroller, it is desirable that its front end be low in order to provide a sufficient drop to rest the feet of the occupant. To this end, I have allowed the side walls 10 of the body to remain in a semicircular terminal form at the front, but made the front wall separate from the said walls and with sector-shaped sides 11a occurring along the inside of the walls 10. The said sides are centered on screws 11b which are driven through them into the walls 10, with washers 11c behind the screw heads. This fastening, however, provides sufficient freedom for the structure of the front wall 11 to be swung down in a circular course to the limit indicated in Fig. 3. It is now seen that the bottom formed by the lowered front wall 11 forms a foot rest for the occupant as seated in the chair-like seat of Fig. 3, the front of the carriage being open as in a stroller.

In order that the front wall 11 of the carriage may be adjustable to several positions in the course to which it is lowered, I have provided a segment 23 along the inside of one of the body walls 10, this segment being similar in curvature to the front wall and secured at its upper end to the side wall by means of a screw 23a. The segment is spaced from the said wall along the greater portion of its course and extends along the inner side of the corresponding sector 11a to be secured at 23b to the corresponding frame rail 15. The segment 23 is formed with a series of longitudinally spaced apertures 23c, and the said sector 11a carries an arched strap 11c straddling the segment 23, the strap 11d being fitted with a spring button 24. This button is pressed to the segment by the spring and by seating in one of the apertures 23c it fixes the position of the movable wall 11 accordingly, so that the frontal opening in the carriage may be varied in accordance with the degree of safety or exposure considered proper in the particular case.

I have illustrated in connection with the improved coach a handy brake and prop control of which brief mention will be made. Thus, when the carriage is to be left standing, it may be locked from travel or tipping over by the depression of a knob 25 heading a side lever 26 positioned handy to the attendant. When the knob 25 is depressed, the brake 27 shown clear of the wheels in Fig. 1, and the prop stand 28 shown clear of the ground in the same figure are moved apart, so that the brake engages the wheels and the prop swings down to the ground and is positioned as indicated in Fig. 4.

It will be evident from the above description that I have provided a simple mechanism for the conversion of the conventional coach from the bed type suitable for infants to the stroller type by means of parts easily manipulated for both the converting and restoring movements. At the same time, the features of comfort and a minimum number of additional parts are clearly evident, making the change easy and the use of the carriage in either form convenient. The improvements do not contain involved mechanical or projecting parts which are apt to get out of order, be in the way or prove unsafe either to the occupant or to the attendant. Finally, it is evident that the mechanical features of the convertible mechanism are entirely concealed from view to the observer of the vehicle, so that the appearance, beauty and design possibilities of the same remain unaffected.

I claim:

1. A baby carriage of the coach type having a frontal opening between its side walls, a frontal closure spanning said opening, sector-shaped extensions of the closure along the inner sides of the front wall, and center pivots for said extensions carried by the side walls, said frontal closure being swingable on said pivots to create a frontal opening and to assume a concealed position in the bottom of the carriage.

2. The structure of claim 1, and means to fix the closure at any point in its pivotal movement.

3. The structure of claim 1, a guide carried by one of the carriage side walls and having perforations in the direction of the closure swing, and a locking button carried by the closure and adapted to be applied to a selected one of the perforations to station the closure at a corresponding position in its swing.

4. A baby carriage having a bottom and sides, said bottom having its front edges raised slightly between said sides, a bed in said carriage spaced above the bottom thereof, a closure for the front end of the carriage the lower edge of said closure being overlapped with said forward edge of said bottom, said closure being movable to telescope with said bottom to dispose a substantial portion of said closure out of sight below the level of said bed and provide an opening in the front of said carriage between said level and the top edges of said sides.

5. The structure of claim 4 and means for adjusting said closure to vary the size of said opening.

6. A baby carriage having a bottom and sides, a bed in said carriage spaced above the bottom thereof, a closure for the front end of said carriage, and said closure being movable to telescope with said bottom and provide an opening in the front of said carriage with substantially all of said closure disposed out of sight below the level of said bed.

7. A baby carriage having a bottom and sides, a bed in said carriage spaced above the bottom thereof, a closure for the front of said carriage, said closure being movable to telescope with said bottom and provide an opening in the front of said carriage with at least a substantial portion of said closure disposed out of sight below the level of said bed, and means for adjusting said closure to vary the size of said opening.

ABRAHAM G. FELDMAN.